United States Patent [19]
Grimes et al.

[11] 3,716,605
[45] Feb. 13, 1973

[54] PRECIPITATION PROCESSES FOR METAL-CONTAINING MATERIALS

[75] Inventors: John Herbert Grimes, Basingstoke; William Dress, Newbury, both of England

[73] Assignee: United Kingdom Atomic Energy Authority, London, England

[22] Filed: Jan. 26, 1970

[21] Appl. No.: 5,964

[30] Foreign Application Priority Data

Jan. 31, 1969   Great Britain..................5,500/69

[52] U.S. Cl. .................264/0.5, 23/143, 23/200, 23/328, 23/333, 23/335, 23/345, 23/346, 23/354, 23/355, 252/301.1 S, 252/317, 252/439, 252/448
[51] Int. Cl......B01j 13/00, C01g 57/00, G21c 21/00
[58] Field of Search....................252/317, 448, 439, 301.1–301.5; 264/.5; 23/328, 333, 345, 354, 355

[56] References Cited

UNITED STATES PATENTS

| | | | |
|---|---|---|---|
| 3,397,257 | 8/1968 | Brambilla et al. | 264/.5 |
| 2,029,617 | 2/1936 | Hiers | 264/51 X |
| 2,039,259 | 4/1936 | Pier et al. | 252/439 X |
| 2,492,808 | 12/1949 | Marisic et al. | 252/317 X |

*Primary Examiner*—Richard D. Lovering
*Attorney*—Larson, Taylor and Hinds

[57] ABSTRACT

To a solution of a soluble salt of the relevant material or metals, e.g., iron, thorium, uranium, or aluminum, is added a polymeric organic compound, eg a polysaccharide such as dextran or carob gum, which renders the solution viscous and forms a complex with the metallic ions. The viscous solution is formed into a suitable physical configuration, eg drops, and contacted with a gaseous reagent to precipitate the metal or metals as insoluble compounds, eg iron can be precipitated by contacting with ammonia gas. The gaseous reagent employed moves relative to the viscous solution in said form of a suitable physical configuration. The organic compound may be driven off by heating and the precipitate reduced to metal if desired.

14 Claims, No Drawings

PRECIPITATION PROCESSES FOR METAL-CONTAINING MATERIALS

CROSS-REFERENCE TO RELATED APPLICATION

The process is a modification of that disclosed in our copending application Ser. No. 626,188 filed Mar. 27, 1967 now U.S. Pat. No. 3,495,954.

BACKGROUND OF THE INVENTION

This invention relates to the production of metal-containing materials and is a modification of the process disclosed in our UK Patent Specification No. 1,175,834.

In the aforementioned Specification there is disclosed a process for the production of metal-containing material comprising adding to a solution of a soluble salt of a metal a polymeric organic compound which forms a viscous solution therewith and forms a complex with the metallic ions, causing the viscous solution to adopt a selected physical configuration, and treating said configuration with a reagent which precipitates the metal as an insoluble compound. The polymeric organic compound may be a polysaccharide such as dextran or carob gum, or may be polyvinyl alcohol, for example.

The reagent is one capable of precipitating the metal salt from solution, and may, for example, be an alkali such as ammonia or caustic soda.

The effect of precipitation is to convert the configurations to discrete gelled entities which can be handled, washed and subsequently treated in various ways, depending on the desired product.

The Specification describes many examples of the process, disclosing that discrete gelled spheres or irregular "gravel" may be formed by dropping or spraying the viscous solution into the reagent, rods or threads by extrusion into the reagent, and coatings by dipping objects wetted with the viscous solution into the reagent. The spheres etc. are subsequently washed and dried, can be fired to produce, for example, oxides; the latter may be reduced to metal in some applications of the process.

In all the disclosed Examples, the precipitating reagent is used in the form of an aqueous solution thereof, for example 0.880 ammonium hydroxide solution or sodium hydroxide solution. It has now been found that the process can be operated satisfactorily with a gaseous precipitating reagent such as ammonia gas, which in some applications is more convenient and economical.

SUMMARY OF THE INVENTION

Thus the present invention provides a process as aforesaid in which at least part of the precipitation of the insoluble compound is effected by treating the selected configuration of the viscous solution with a gaseous precipitating reagent. Substantially the whole of the precipitation may be so effected.

The process includes the steps of:

a. contacting an aqueous solution containing a dissolved water soluble metal salt with a polymeric organic compound having a plurality of hydroxy groups and being other than a hydroxypropyl methyl cellulose resin which increases in viscosity in the presence of an alkaline, which polymeric organic compound is capable of forming a viscous solution with said first aqueous solution and of forming a complex with metal ions of said aqueous solution to form said viscous solution including said complex;

b. forming said viscous solution including said complex into at least one entity of selected physical configuration; and c. contacting said formed entity with a gas comprising a reagent capable of reacting with the metal moiety of said complex to precipitate said metal as an insoluble inorganic compound to convert said metal moiety to said insoluble inorganic compound in said entity, said reagent additionally being capable of precipitating the metal salt of said aqueous solution.

Where the desired insoluble compound is an oxide or hydroxide, a convenient gaseous precipitating agent is ammonia. The ammonia may be derived from ammonium hydroxide solution by boiling, or from cylinders, or directly from plant sources, and may be wet or dry. Other basic gases such as gaseous organic amines, eg methylamine, may be used instead of ammonia.

Insoluble sulphide compounds may be produced by using hydrogen sulphide as the precipitating reagent, and mixed insoluble compounds may be produced by using a corresponding mixture of gaseous precipitating reagents. A gaseous reagent or reagents can also be used with a solution containing a mixture of metallic ions.

The same polymeric organic compounds which can be used when the precipitating reagent is a solution may be used in the present process.

Suitable apparatus for carrying out the present process may comprise a vertical column down which drops of the viscous metallic salt solution are allowed to fall under gravity and up which is passed a stream of the precipitating gas. The rate of gas flow and the column height are adjusted so that sufficient precipitation has taken place during their fall to ensure that the gelled spheres or gravel so formed do not disintegrate on impact at the foot of the column. It may be arranged that the spheres or gravel fall into a liquid eg water up through which the gas is bubbled and in which the precipitation is continued by dissolved gas. However the process may be operated without liquid in the column, the spheres etc. falling onto a porous surface up through which the gas passes; substantially all the precipitation may be effected during their fall, or it may continue with the spheres collected at the foot of the column, which lie in the path of the gas.

In another form of the invention, gelled filaments may be formed by extruding the viscous solution through one or more spinnerets at the top of the column, up which the gas passes, and winding the filaments, preferably under tension, so formed on to a drum at the foot of the column. Artificial fibers may be produced in this way. Coatings may be formed on bodies by contacting the bodies, wetted with the viscous solution, with the gaseous reagent.

To avoid precipitation and gelling taking place at the dropping nozzle, spinneret or other orifice through which the viscous solution passes at the top of the column, a current of a nonreactive gas such as air may be directed past it to prevent access thereto of the gaseous reagent.

Unused gaseous reagent may be extracted at the top of the column and recirculated.

Instead of causing the gaseous reagent to flow relative to the selected configurations of viscous solution, the gas may be stationary relative thereto.

The gaseous reagent may be diluted, if desired, with a nonreactive gas such as air.

In this Specification, the term "gas" includes vapors.

One application of the present process is in the production of metal powders, eg iron powder, where a reducible oxide "gravel" is the preferred material. Such material may be produced by dropping or spraying a viscous iron salt solution, eg ferric chloride, down a column up which passes ammonia gas, on to a moving band at the foot of the column. The gelled gravel so formed may be passed by the band under water sprays to wash the gravel free of byproducts, to facilitate which an apertured, eg mesh, band may be used. The washed gravel may be subsequently collected, dried, and reduced to the metallic form. The filtration stage involved in using a precipitating solution is thereby eliminated.

Depending on the reactivity of the viscous solution with the gas, it may be desirable in some applications of the present process to form smaller entities, eg drops, than would be used with a precipitating solution, because of the shorter time during which they contact the precipitating reagent.

EXAMPLES OF THE PRESENT PROCESS

Example 1

To 10 mls of a solution containing 200 gm/liter of thorium in 2M nitric acid was added 2 gm of dextran (m.w. $5 \times 10^5$). The viscous solution so formed was dropped through a 1 mm capillary orifice into a vertical tube about 60 cm high and 5 cm in diameter up which a stream of ammonia was passed at a rate of about 10 liters/min. The ammonia was obtained by boiling an ammonium hydroxide solution. The dropping rate was about three drops/sec. As the drops fell through the gas, they gelled and had become fully formed rubbery spheres by the time they reached the bottom of the tube, where they remained in contact with the gas. The first spheres fell on to a glass-wool pad resting on a porous sinter plate, up through which passed the gas; subsequent spheres fell on to the first spheres, bouncing as they did so without damage. After a times the spheres were removed from the tube, washed with three volumes of water, drained, and spread out to dry in air for some hours at room temperature. The resulting spheres, believed to be a hydrated thorium oxide gel, were hard glassy, transparent, colorless beads.

Example 2

To 10 mls of a solution containing 200 gm/liter of uranium in 2M nitric acid was added 2 gm of dextran (m.w. $3 \times 10^5$). Drops were treated as in Example 1 to give orange spheres of good quality containing precipitated uranium diuranate, which could be fired to produce uranium oxide.

Example 3

To 10 mls of an aqueous solution of ferric chloride containing 100 gm/liter of iron was added 2 gm of dextran (m.w. $3 \times 10^5$). Drops were treated as in Example 1. Good quality spheres of a hydrated iron oxide gel were formed which bounced on impact, as in Example 1. The spheres were removed, washed free of ammonium chloride, and dried to hard stable spheres.

Example 4

Example 3 was repeated with the modification that the ammonia gas entering the bottom of the tube was thoroughly dried in a long drying tube containing calcium oxide. Excellent spheres of iron oxide gel were again obtained.

Example 5

To 10 mls of an aqueous solution of aluminum nitrate containing 50 gm/liter of aluminum was added 1 gm of dextran (m.w. $5 \times 10^5$). The viscous solution so formed was dropped through a 1 mm capillary orifice into a vertical tube 300 cm high and 7.5 cm in diameter up which was passed ammonia vapor which had been dried by passing over calcium oxide. The product which collected at the foot of the tube, on a glass wool pad supported on a sinter glass plate, was discrete entities of irregular gelled gravel containing precipitated aluminum hydroxide. The gravel was washed in cold water and dried in air at room temperature, and was then suitable for firing to produce alumina-based ceramic and catalyst materials.

It was found that even when the flow of ammonia gas was cut off, the stationary gas remaining in the tube was sufficient to continue precipitating the gravel for a considerable time.

Example 6

To 10 mls of an aqueous solution of ferric chloride containing 200 gm/liter of iron was added 1 gm of carob gum. The viscous solution so formed was dropped into ammonia as in Example 5. The product which collected was discrete entities of irregular gelled gravel containing iron oxide. The gravel was washed in cold water and dried in air at room temperature, and was then suitable for firing in a reducing atmosphere to produce metallic iron.

We claim:

1. A process for the production of a metal-containing material comprising an insoluble oxygen or sulfur containing metal compound, said process comprising the steps of:
    a. contacting an aqueous solution containing a dissolved water soluble metal salt with a polymeric organic compound selected from the group consisting of polysaccharides and polyvinyl alcohol and being other than a hydroxypropyl methyl cellulose resin which increases in viscosity in the presence of an alkaline, which polymeric organic compound is capable of forming a viscous solution with said first aqueous solution and of forming a complex with metal ions of said aqueous solution to form said viscous solution including said complex;
    b. forming said viscous solution including said complex into at least one entity of selected physical configuration; and
    c. contacting said formed entity with a gas moving relative to said entity and comprising a reagent capable of reacting with the metal moiety of said complex to precipitate said metal as an insoluble oxygen or sulfur-containing inorganic metal compound to convert said metal moiety to said insoluble inorganic compound in said entity, said reagent additionally being capable of precipitating the metal salt of said aqueous solution.

2. A process as claimed in claim 1 wherein said polymeric organic compound is a polyaccharide selected from the group consisting of dextran and carob gum.

3. A process as claimed in claim 1 wherein the gas comprises ammonia.

4. A process as claimed in claim 1 wherein the gas comprises an organic amine.

5. A process as claimed in claim 4 wherein the amine is methylamine.

6. A process as claimed in claim 1 wherein the gas comprises hydrogen sulphide.

7. A process as claimed in claim 1 wherein the gas also comprises a non-reactive diluent.

8. A process as claimed in claim 1 wherein the gas is passed up a column and the formed entity passes down the column through the gas.

9. A process as claimed in claim 8 wherein the foot of the column contains a liquid and the gas is passed upwards through the liquid, said entity entering the liquid at the foot of the column.

10. A process as claimed in claim 1 wherein the viscous solution is formed into entities having a drop configuration which are allowed to fall through the gas.

11. A process as claimed in claim 1 wherein the viscous solution is extruded through an orifice as an entity of given cross-section and said extruded entity is contacted with said gas.

12. A process as claimed in claim 1 wherein the metal comprises iron.

13. A process as claimed in claim 1 wherein said metal salt is a salt of a metal selected from the group consisting of iron, thorium, uranium and aluminum.

14. A process as claimed in claim 13 wherein said gas is selected from the group consisting of ammonia, organic amines, and hydrogen sulfide.

* * * * *